(12) United States Patent
Bauer et al.

(10) Patent No.: US 7,261,846 B2
(45) Date of Patent: Aug. 28, 2007

(54) FIBER-REINFORCED CERAMIC BRAKE LININGS

(75) Inventors: Moritz Bauer, Augsburg (DE); Ronald Huener, Baar (DE); Peter Winkelmann, Thierhaupten (DE)

(73) Assignee: Audi AG (DE)

( * ) Notice: Subject to any disclaimer, the term of this patent is extended or adjusted under 35 U.S.C. 154(b) by 306 days.

(21) Appl. No.: 10/624,698

(22) Filed: Jul. 22, 2003

(65) Prior Publication Data

US 2004/0127600 A1  Jul. 1, 2004

(30) Foreign Application Priority Data

Jul. 24, 2002  (DE)  ............... 102 33 729

(51) Int. Cl.
  C01B 31/00 (2006.01)
  B29C 67/00 (2006.01)
  D04H 1/00 (2006.01)
  B32B 5/14 (2006.01)
  B32B 9/00 (2006.01)

(52) U.S. Cl. .................. 264/29.1; 264/29.5; 264/29.7; 264/82; 264/137; 264/136; 264/608; 428/292.1; 428/307.7; 428/408; 523/152

(58) Field of Classification Search ............... 264/29.5, 264/29.1, 29.7, 82, 137, 608, 136; 428/307.7, 428/292.1, 408; 523/152
See application file for complete search history.

(56) References Cited

U.S. PATENT DOCUMENTS

| | | | |
|---|---|---|---|
| 6,051,167 A * | 4/2000 | Withers et al. ............ 264/29.2 |
| 6,051,323 A | 4/2000 | Ash et al. |
| 6,079,525 A | 6/2000 | Dietrich et al. |
| 6,248,269 B1 * | 6/2001 | Dietrich et al. ............ 264/29.1 |
| 6,261,981 B1 * | 7/2001 | Dietrich et al. ............ 501/95.2 |
| 6,668,985 B2 * | 12/2003 | Krenkel et al. ........ 188/251 M |
| 2001/0001189 A1 | 5/2001 | Johnson |
| 2003/0134098 A1 | 7/2003 | Bauer et al. |

FOREIGN PATENT DOCUMENTS

| | | |
|---|---|---|
| DE | 42 20 630 | 12/1993 |
| DE | 197 11 829 | 9/1998 |
| DE | 197 27 586 | 2/1999 |
| DE | 197 21 473 | 11/2002 |
| EP | 0 991 873 | 4/2000 |
| EP | 1 340 733 | 9/2003 |

* cited by examiner

Primary Examiner—Rena Dye
Assistant Examiner—Lawrence Ferguson
(74) Attorney, Agent, or Firm—Connolly Bove Lodge & Hutz LLP

(57) ABSTRACT

A ceramic brake lining which is reinforced with carbon fibers and has a matrix which consists essentially of silicon carbide together with silicon and/or carbon, wherein the reinforcing fibers used are long fibers having a mean length of at least 10 mm which are aligned in the plane parallel to the friction surface, a process for its production and its use in combination with brake discs made of C/SiC or CFC or as lining in friction clutches.

5 Claims, No Drawings

FIBER-REINFORCED CERAMIC BRAKE LININGS

FIELD OF THE INVENTION

The invention relates to fiber-reinforced ceramic brake linings.

BACKGROUND OF THE INVENTION

Conventional brake systems comprise a brake caliper, a disc made of cast iron or steel and brake linings which predominantly comprise friction materials bound with phenolic resins or sintered metals. If the metallic brake disc is replaced by ceramic systems, in particular by brake discs made of C/SiC (ceramic which is reinforced with carbon fibers and whose matrix comprises silicon carbide together with elemental silicon and residues of unreacted carbon), the surface temperature of the brake disc and of the brake lining is increased by at least 200 K due to higher coefficients of friction, lower thermal conductivity and lower heat capacity of the disc. The wear of conventional brake linings increases greatly as a result of the high temperatures. Brake linings bound with phenolic resin are subject to thermal decomposition, while sintered metal brake linings melt at the surface. These disadvantages can be avoided when brake linings which can meet the increased thermal demands of the systems with ceramic brake discs are employed.

The use of fiber-reinforced C/SiC brake linings in conjunction with ceramic brake discs made of C/SiC is known from the patent application DE-A 197 27 586. The essential element of that invention is the use of the same material for both friction partners, viz. brake disc and lining. C/SiC brake discs are thus paired with a brake lining of the same type. However, the brake lining should have a lower hardness than the corresponding brake disc. This is achieved by the C/C body of the brake lining having a higher density before silicization than that of the brake disc, as a result of which it has a lower SiC content after silicization. The fibers of the brake lining are preferably aligned isotropically, as a result of which a uniform thermal conductivity transverse to the brake surface is said to be achieved.

In high-performance brake systems comprising ceramic brake discs and ceramic brake linings, the linings absorb comparatively high braking energies, resulting in considerable heating of the brake lining. While the lining material is generally designed for high operating temperatures, it is technically difficult also to design the brake shoe, the lining support and the brake piston in such a way that these will withstand high operating temperatures. In particular, prolonged thermal stress leads to overheating of the brake liquid and the elastomer rings around the pistons.

SUMMARY OF THE INVENTION

It is therefore an object of the invention to provide a ceramic brake lining for brake discs, in particular when having a ceramic friction surface, which will withstand high temperatures and even when the friction pairing is highly thermally stressed transmit only a very small amount of heat to the brake lining support, the brake shoe and the brake piston.

This object is achieved by provision of a brake lining having strongly anisotropic thermal conduction, with the thermal conduction parallel to the friction surfaces of the brake linings being significantly greater than that in the direction of the normal line of the friction surface, i.e. perpendicular to the latter.

The invention accordingly provides a ceramic brake lining which is reinforced with carbon fibers and has a matrix which consists essentially of silicon carbide together with silicon and/or carbon, wherein the reinforcing fibers used are long fibers which are aligned in the plane parallel to the friction surface so as to give strongly anisotropic thermal conduction of the brake lining with the thermal conductivity perpendicular to the friction surface preferably being not more than 50% of the thermal conductivity parallel to the friction surface. The brake lining of the invention can be obtained by the inexpensive process of silicon melt infiltration of carbon bodies reinforced with carbon fibers ("C/C bodies").

The alignment of the fibers is said to be parallel to the friction surface if the angle between the friction surface and the straight fiber segments averaged over all fiber segments is not more than 10°, preferably not more than 5° and in particular not more than 3°.

The matrix is said to consist essentially of silicon carbide together with silicon and/or carbon if the sum of the mass fractions of the materials mentioned is at least 50% of the mass of the matrix, preferably at least 60% and in particular at least 70%.

The invention further provides a brake lining comprising fiber-reinforced C/SiC in which the reinforcing fibers are present in the form of a plurality of woven carbon fiber mats which are stacked one above the other. To produce such a lining, the C/C intermediate body is preferably further densified at least once by means of pyrolytic carbon which is preferably formed via liquid infiltration with a carbonizable organic material, and subsequent pyrolysis.

The invention further provides the combination of such a brake lining with a fiber-reinforced C/SiC brake disc.

The brake lining of the invention requires fiber reinforcement which leads to highly anisotropic thermal conduction, where it is particularly important to achieve a very low thermal conductivity perpendicular to the friction surface.

Long carbon fibers which have a thermal conductivity higher than that of the matrix comprising SiC, Si and C are therefore used as reinforcing fibers. The fibers can also, preferably, be present in the form of bundles each comprising at least about 100 individual fibers. In the present context, long fibers are fibers which have a mean length of at least 10 mm, preferably at least 30 mm. The length of the fibers is preferably of the same order of magnitude as the external dimensions of the friction lining body. Particular preference is given to the individual fibers or fiber bundles having a length such that they extend transversely across the friction lining body from one side to the other without interruption.

The anisotropy of the thermal conduction is achieved by the carbon fibers being aligned essentially in a plane parallel to the friction surface. This fiber alignment is in contrast to the predominantly isotropic fiber alignment of the friction linings known from the patent application DE-A 197 27 586 and the short-fiber-reinforced C/SiC preferred as the other element in the friction pairing.

Compared to the short-fiber-reinforced C/SiC materials, the thermal conductivity in the fiber direction in a C/SiC material reinforced with long fibers is higher because heat transport in this direction is interrupted less frequently by the matrix which has a lower thermal conductivity.

The long fibers are used in the form of at least one layer of unidirectional or multidirectional layers, mats, woven fabrics or braided materials. In the case of a plurality of layers, these are stacked one above the other. These fibers are aligned essentially parallel to the friction surface, so that the thermal conductivity parallel to the friction surface is higher than that perpendicular thereto.

The thermal conductivity of the brake lining parallel to the friction surface is preferably at least 21 W/m·K, particularly preferably at least 25 W/m·K and in particular at least 40 W/m·K. Its thermal conductivity perpendicular to the friction surface is preferably not more than 19 W/m·K, particularly preferably not more than 15 W/m·K and in particular not more than 10 W/m·K. In a preferred embodiment of the invention, the thermal conductivity perpendicular to the friction surface is not more than 50% of the thermal conductivity parallel to the friction surface. The thicker the brake lining, the greater its heat capacity, so that it can take up more heat during braking. For this reason, higher absolute values of the thermal conductivity in the direction perpendicular to the friction surface can be tolerated as the material thickness increases.

In a preferred embodiment of the invention, the brake lining comprises at least 5, particularly preferably from 10 to 50, superposed layers of woven carbon fiber fabric. The thermal conductivity of the brake lining perpendicular to the friction surface in this arrangement is preferably set to from 4 to 12 W/m·K.

Coefficient of friction and friction comfort of the lining material are determined, in particular, by the content of SiC, carbon and carbon fibers in the friction surface. Preference is therefore given to friction linings in which the uppermost layer exposed to friction has a volume fraction of at least 50% of carbon fibers. The mass fraction of silicon carbide in the material of the brake lining of the invention is preferably at least 10%, particularly preferably in the range from 12 to 25%.

The thermal conductivity of the friction material is also determined by the composition of the matrix which is made up predominantly of Si and SiC. The thermal conductivity of the pure substances is about 14 W/m·K for silicon and about 90 W/m·K for SiC. Matrix compositions which have a comparatively high Si content, i.e. a low thermal conductivity, for C/SiC materials are therefore advantageous for the purposes of the invention since the effect of thermal conduction by the fibers is more pronounced here. The mass fraction of silicon in the material of the brake lining of the invention is preferably at least 10% and particularly preferably in the range from 12 to 25%. It has to be taken into account that a higher proportion of silicon in the friction layer (the uppermost layer of the brake lining) has an adverse effect both on the coefficient of friction and on the comfort characteristics. For this reason, the friction layer particularly preferably has a silicon content which is lower than the silicon carbide content.

As further constituents, additives which, in particular, serve to modify the coefficient of friction or the comfort characteristics can be added to the material of the brake lining, with their mass fraction in the material of the brake lining usually being not more than 5%. The additives are preferably thermally stable up to the temperature of the silicon melt infiltration which is the preferred production process, and do not suffer impairment of their function under these process conditions. Preferred additives are ductile metals, for example copper, or particles of hard material, for example tungsten carbide, titanium carbide, molybdenum silicide and chromium carbide, or lubricants, for example manganese sulphide.

The additives can also be introduced after production of the C/SiC body by infiltration by molten silicon, in the case of metals such as copper as additives by, for example, further infiltration with these metals. If the surface of the C/SiC body is etched or oxidized before this further infiltration, the wettability by liquid metals which penetrate into the friction body and can also react at least partly with the materials in the C/SiC body is increased.

Additives can also be introduced in the form of pins or rods running transverse to and/or parallel to the friction direction and extending to the support plate. These pins and/or rods preferably consist of the additive material mentioned or comprise mixtures of the additive material mentioned with the material of the matrix, with or without addition of short fibers (having a length below the above-mentioned length), preferably short carbon fibers.

Apart from the reduced thermal conductivity of the friction material perpendicular to the friction surface, a further advantage of the fiber orientation according to the invention is a high mechanical stability in the main stress direction of the linings, namely in the plane of the friction surface. In contrast, an isotropically fiber-reinforced material, e.g. a C/SiC reinforced with bundles of short fibers, has no preferred reinforcement within the plane parallel to the friction surface.

For use in a brake system comprising brake lining and brake disc, the brake lining of the invention is usually fastened to a metallic support, viz. the lining plate. A further insulator, preferably made of ceramic material, can, if desired, be located in between.

The brake lining is joined to the lining plate in a known manner, namely fixed by means of adhesives and/or mechanically anchored. In a preferred embodiment of the invention, the lining is joined to the lining plate by means of at least two screws. These screws can, in this embodiment, also be utilized as a wear indicator, namely by the screw heads contacting the friction surface after the intended amount of friction material has been abraded away and producing an audible sound on braking.

The lining plate for attachment of the brake lining is preferably configured so that it encloses the brake lining around the outer contour of the lining. This is achieved by means of a rim which is stepped by about 0.5 to 3 mm, as a result of which the brake lining is additionally held.

The combination of low thermal conductivity in the direction perpendicular to the friction surface and the low wear of the friction material makes it possible to use comparatively thin linings. This advantage can be utilized either for reducing the space taken up by the friction lining construction or can, if the customary construction volume is retained, be utilized for an additional layer of a thermal insulator. In this way, further insulation materials can also be provided behind the lining plate without more total space being required. Insulation materials provided are, in particular, ceramic materials and/or fiber materials based on silicon oxides and/or aluminum oxides.

The invention further provides a process for producing the brake linings, which comprises the following essential steps:

a) production of an arrangement of carbon fibers arranged essentially in a plane, where the fibers may be present in the form of individual fibers, fiber bundles or fiber yarns and the fibers and/or fiber bundles or fiber yarns may be bound by a carbonizable binder, b) shaping and/or curing of the bound fiber arrangement under pressure and/or at elevated temperature, if desired followed by further densification by means of carbonizable carbon precursors, c) carbonization or graphitization of the bound cured fiber arrangement to produce a shaped body comprising carbon reinforced with carbon fibers (C/C), d) at least one further densification of the C/C shaped body by means of pyrolytic carbon formed either by liquid-phase infiltration with carbonizable carbon precursors and subsequent carbonization or by gas-phase infiltration with carbon, e) infiltration of the densified C/C shaped body with a silicon melt and partial reaction of the silicon with at least part of the carbon in the shaped body to form silicon carbide, so as to give a composite ceramic comprising carbon fibers embedded in a matrix comprising SiC, Si and C (C/SiC).

For the present purposes, carbon precursors are defined as materials which decompose on heating in the absence of oxidants to form a residue which consists essentially of carbon (i.e. the mass fraction of carbon is more than 50%). The carbonizable carbon precursors which are used to form pyrolytic carbon in the further densification of the carbon body in the steps b) or d) include, in particular, organic polymers, preferably pitches or phenolic resins, but also organometallic polymers, in particular organosilicon polymers such as polysiloxanes or polysilanes. Carbonization is carried out by known methods, preferably at temperatures in the range from 750 to 950° C. in a stream of nitrogen.

The fiber arrangement is preferably produced by the known prepreg process in which a plurality of fiber layers impregnated with binders are stacked one above the other. As binders, it is possible to use, for example, phenolic resins.

The addition of additives is preferably carried out in step a) or b).

Melt infiltration of the C/C body in step e) is usually carried out using a melt of technical-grade silicon.

However, it is also possible to add small amounts of further metals, for example titanium, chromium, iron, copper and molybdenum, to the melt in order to modify the frictional or wear properties. For the present purposes, silicon is also considered to be a metal.

The production process of the invention has the further advantage that, inter alia, the coefficient of friction can be adjusted in a simple manner via the density and the free carbon content of the C/C intermediate body, since this free carbon content essentially determines the composition of the matrix formed by infiltration, in particular the ratio of the masses of silicon to silicon carbide. Here, low densities of the C/C intermediate body and correspondingly low free carbon contents lead to a high ratio of the mass of Si to the mass of SiC.

Preferred friction partners for the brake lining of the invention are bodies made of ceramic materials. Metal-ceramic and fiber-reinforced ceramic composites are of particular importance here.

Particularly preferred friction partners for the brake lining of the invention are bodies which have at least one friction layer which consists essentially of C/SiC, in particular C/SiC reinforced with short fibers. Processes for producing bodies having such short-fiber-reinforced C/SiC friction layers, in particular C/SiC brake discs, are known from, for example, DE-A 197 10 105 and comprise the following steps:

a) production of a mixture of, firstly, short, cut carbon-containing fibers or fiber bundles which may have been coated with a coating and, secondly, fillers and/or binders such as resin and/or pitch, b) shaping of the mixture under pressure and/or at elevated temperature, c) pyrolysis or graphitization to produce a shaped body, in particular a shaped body comprising carbon reinforced with carbon fibers (C/C), d) infiltration of the shaped body with a silicon melt and partial reaction of the carbon in the shaped body to form SiC, so as to give a composite ceramic comprising carbon-containing fibers embedded in a matrix comprising SiC, Si and C (C/SiC).

As an alternative to step d) of this process, the matrix can also be produced by gas-phase infiltration (CVD "Chemical Vapour Deposition", or CVI, "Chemical Vapour Infiltration") to form SiC or by pyrolysis of silicon-containing preceramic polymers, with a shaped body of a composite ceramic comprising carbon-containing fibers embedded in a matrix comprising SiC, Si and C (C/SiC) likewise being formed.

The mass fraction of silicon carbide in the matrix of the C/SiC material which is preferably used as friction partner for the brake linings is preferably at least 50%. The friction partner particularly preferably has a mass fraction of silicon carbide of at least 65% and in particular from 80 to 100%, at least in the layer facing the brake lining.

Other carbidic ceramics reinforced with carbon fibers are also suitable as friction partners for the brake lining of the invention.

One of the preferred applications of the friction material is its use as brake lining in brake systems having brake discs made of C/SiC, in particular internally ventilated C/SiC brake discs. However, the brake linings of the invention can also be used in combination with brake discs comprising carbon reinforced with carbon fibers ("carbon fibre reinforced carbon", CFC or CFRC). The brake linings are mounted on a caliper that extends around the flat surfaces of the brake disk.

Linings according to the invention can also be advantageously used in other friction pairings, for example in friction clutches, where they are combined with a clutch disk.

The invention claimed is:

1. A process for producing a brake lining which is reinforced with carbon fibers and has a matrix which consists essentially of silicon carbide together with silicon and/or carbon, wherein the reinforcing fibers used are long fibers having a mean length of at least 10 mm which are aligned in the plane parallel to the friction surface, which process comprises the following steps:

a) production of a fiber arrangement of carbon fibers arranged essentially in a plane, wherein the fibers may be present in the form of individual fibers, fiber bundles or fiber yarns and the fibers and/or fiber bundles or fiber yarns being bound by a carbonizable binder, b) shaping and/or curing of the bound fiber construction under pressure and/or at elevated temperature, if desired followed by further densification by means of carbonizable carbon precursors, c) carbonization or graphitization of the bound cured fiber construction to produce a shaped body comprising carbon reinforced with carbon fibers (C/C), d) at least one further densification of the C/C shaped body by means of pyrolytic carbon formed either by liquid-phase infiltration with carbonizable carbon precursors and subsequent carbonization or by gas-phase infiltration with carbon, and e) infiltration of the densified C/C shaped body with a silicon melt and partial reaction of the silicon with at least part of the carbon in the shaped body to form silicon carbide, so as to give a composite ceramic comprising carbon fibers embedded in a matrix comprising SiC, Si and C (C/SiC)

such that the mass fraction of silicon in the material of the brake lining is at least 10%, and the mass fraction of silicon carbide is from 10% to 25%, and wherein the uppermost layer exposed to friction has a volume fraction of at least 50% of carbon fibres, and wherein the silicon content in the said friction layer is lower than the silicon carbide content in the said layer.

2. The process as claimed in claim 1, wherein the silicon melt in step e) further comprises additional metals selected from the group consisting of titanium, iron, chromium, copper and molybdenum.

3. A method of use of the brake lining obtained by the process of claim 1 in combination with brake discs made of C/SiC, comprising arranging the brake linings in a caliper which extends around the flat surfaces of the brake disk.

4. A method of use of a brake lining as claimed in claim 3 comprising fastening the brake lining on a metallic support, and combining the said brake lining on the said support with brake discs made of CFC to yield a brake system.

5. A method of use of a lining as obtained by the process of claim 1 as friction lining in a friction clutch, comprising combining the said lining with a clutch disk.

* * * * *